US007313787B2

(12) United States Patent
Motokawa et al.

(10) Patent No.: US 7,313,787 B2
(45) Date of Patent: Dec. 25, 2007

(54) COMPILER AND METHOD FOR OPTIMIZING OBJECT CODES FOR HIERARCHICAL MEMORIES

(75) Inventors: Keiko Motokawa, Yokohama (JP); Ichiro Kyushima, Yokohama (JP); Shinichi Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 784 days.

(21) Appl. No.: 10/665,931

(22) Filed: Sep. 19, 2003

(65) Prior Publication Data

US 2004/0199907 A1 Oct. 7, 2004

(30) Foreign Application Priority Data

Apr. 1, 2003 (JP) .............................. 2003-097573

(51) Int. Cl.
*G06F 9/45* (2006.01)
(52) U.S. Cl. ..................... 717/150; 717/140; 717/151; 717/152; 717/153
(58) Field of Classification Search ......... 717/124–158
See application file for complete search history.

(56) References Cited

U.S. PATENT DOCUMENTS

| 5,704,053 | A * | 12/1997 | Santhanam ................. 717/158 |
| 7,000,227 | B1 * | 2/2006 | Henry ........................ 717/152 |
| 2003/0093771 | A1 * | 5/2003 | Ogawa et al. .............. 717/125 |
| 2003/0097652 | A1 * | 5/2003 | Roediger et al. ........... 717/160 |
| 2004/0088690 | A1 * | 5/2004 | Shaul ......................... 717/154 |
| 2004/0098713 | A1 * | 5/2004 | Ogawa et al. .............. 717/160 |
| 2004/0205718 | A1 * | 10/2004 | Reynders .................... 717/124 |

OTHER PUBLICATIONS

"Optimizing FORTRAN90, (HI-UX/MPP for SR8000)" user's guide p. 6.5, Hitachi, Ltd. (1999).
"XL Fortran for AIX User's Guide, Version 7 Release 1" pp. 192-195, IBM Corporation (2000).
Dowd "Memory Reference Optimization," in High Performance Computing; section 11.1, O'Reilly and Associates, Inc., Sebastopol, CA, (1993).
Mowry et al. "Design and Evaluation of a Compiler Algorithm for Prefetching," Preceedings of the Fifth International Conference on Architectural Support for Programming Languages and Operating Systems, Boston, MA, pp. 62-73 (1992).
Wolf et al. "Improving Locality and Parallelism in Nested Loops," PhD thesis, Stanford University, Dept. of Computer Science (1992).

* cited by examiner

*Primary Examiner*—Meng-Al T. An
*Assistant Examiner*—Mark P. Francis
(74) *Attorney, Agent, or Firm*—Townsend and Townsend and Crew LLP

(57) ABSTRACT

Different optimizing methods are applied in response to such a memory hierarchy to which a program mainly accesses when the program is executed. A memory hierarchy to which a program mainly accesses is designated by a user with employment of either a compiler option designation or a designation statement contained in the program. In a compiler, a memory hierarchy designation is analyzed, and an optimizing process according to the designated memory hierarchy is carried out.

18 Claims, 11 Drawing Sheets f90 −O −data=L2 test.f
301

FIG. 4

```
subroutine test1 (A,B,C,D,E,F,N)
real*8 A(N),B(N),C(N),D(N),E(N),F(N)
```
*option data (L1)   — 401

```
  do 10 I=1,N
    A(I)=B(I)
10 continue
```
*option data (MEM)  — 402

```
  do 20 I=1,N
    C(I)=D(I)
20 continue
```
*option data (L2)   — 403

```
  do 30 I=1,N
    E(I)=F(I)
30 continue
  end
```

FIG. 6

| LOOP NUMBER (601) | "data" DESIGNATION (602) |
|---|---|
| 1 | L2 |
| 2 | MEM |
| 3 | NO DESIGNATION |
| 4 | L1 |

COMPILER AND METHOD FOR OPTIMIZING OBJECT CODES FOR HIERARCHICAL MEMORIES

BACKGROUND OF THE INVENTION

The present invention relates to a compiling method capable of reducing execution time of an object program in computer utilizing techniques. More specifically, the present invention is directed to an optimizing-designation method used when a source program is compiled with respect to an architecture equipped with a plurality of memory hierarchies.

With improvements in operating speeds of microprocessors, latencies of main storage accesses are increased. Most of the current processors is provided with cache memories having relatively small memory capacities, the access speeds of which are faster than those of the main storage. Furthermore, in some processors, cache memories are constituted in such a hierarchical form as a primary cache and a secondary cache. Since memories are formed in the hierarchical form, data of such a memory hierarchy whose latency is small is accessed by a processor as many as possible, so that a total number of accesses by the processor with respect to data of a memory hierarchy whose latency is large can be reduced. In other words, a processor which executes a memory access instruction can access a primary cache in a short latency when the data hits the primary cache. When the data misses the primary cache, this processor accesses a second cache. When the data hits the secondary cache, the processor can subsequently access data thereof in a short latency. Only when the data misses all of the cache hierarchies, the processor accesses the main storage.

As a method of capable of hiding (namely, not revealing) a latency during cache miss operation, an instruction scheduling method may be employed which executes a process in such a manner that a distance between a load instruction and an instruction (will be referred to as "use instruction" hereinafter) for using the loaded data is made sufficiently longer. A memory latency is employed as a reference for determining how many cycles the distance between both instructions is separated.

A method for "hiding" a latency of referring to the main storage during cache miss operation is described in, for instance, Todd C. Mowry et al, "Design and Evaluation of Compiler Algorithm for Prefetching", Architectural Support for Programming Languages and Operating Systems, pp. 62 to 73 in 1992 (will be referred to as "Publication 1" hereinafter). Publication 1 discloses a so-called "software prefetching (prefetch optimization)". In this software prefetching method, while a prefetch instruction is prepared for a processor and this prefetch instruction instructs to move data from the main storage to a cache in a preceding manner, a prefetch instruction is inserted into an object program by a compiler. If the prefetch instruction is utilized, then the latency of referring to the main storage can be "hidden". That is, while data to which a processor refers in a succeeding loop iteration is previously moved from the main storage to the cache, another calculation can be carried out by this processor at the same time if this prefetch instruction is utilized.

In this software prefetching method, when a prefetch instruction is produced with respect to data reference by the processor within a loop, first of all, the number of execution cycles "C" required for one iteration of this loop is estimated. Next, calculation is made of such a value $\alpha = \text{CEIL}(L/C)$ which is defined by dividing the number of cycles "L" by "C". This cycle number "L" is required in order that data is moved from the main memory to a cache (memory latency). Symbol "CEIL" is assumed as a symbol which indicates rounding up any numbers smaller than, or equal to a decimal point. Since the data to which the processor refers after "$\alpha$" times of loop iterations has been previously prefetched, when the processor refers to this data after "L" cycles, the data has already been reached to the cache, so that the processor hits the cache and can execute the program at a high speed. In a case where data is prefetched to a primary cache, if the data has already been stored in the primary cache, then the prefetching operation is no longer required. Also, in a case where data is present in the secondary cache, the number of cycles which requires to move the data from the secondary cache to the primary cache may be used as the memory latency "L", whereas in a case that data is present in the main storage, the number of cycles which requires to move the data from the main storage to the primary cache may be used the memory latency "L". However, it is normally unclear which memory hierarchy data is present in. As a consequence, assuming now that the data is present in the main storage, process is carried out.

Another memory optimizing method is known which can reduce the number of cache misses by way of a program transformation capable of improving a data locality. As a specific program transformation, there are proposed: a loop tiling method, a loop interchanging method, and a loop unrolling method.

The loop tiling method corresponds to a loop transformation operation having the following purpose. That is, in a case where data to which a processor refers within a multiply nested loop owns a reuse, it is so designed that the processor again refers to data which has once been loaded on a cache before this loaded data is ejected from the cache since the processor refers to another data. The loop tiling method is described in Michael Edward Wolf, "Improving Locality and Parallelism in Nested Loops", Technical Report: CSL-TR-92-538, in 1992 (will be referred to as "Publication 2" hereinafter).

The loop interchange method and the loop unrolling method, which aim to optimize the memory reference pattern, are described in Kevin Dowd, "High Performance Computing", O'Reilly & Associates, Inc., 11.1 section (will be referred to as "Publication 3" hereinafter).

In order to realize the above-described latency hiding optimization and also the above-explained data localization, such information is required which may depend upon attributes of a target machine, for instance, the number of cycles required to memory reference, and a cache size. Normally, information as to a target machine is held as internal information in a compiler. There is another method for instructing the above-described information by a user. In such a publication, i.e., Hitachi, Ltd. (HI-UX/MPP for SR8000) "Optimizing FORTRAN90 User's Guide", 6.2 section (will be referred to as "Publication 4" hereinafter), the following aspect is described. That is, the user can designate that the number of cycles required to read from the memory is "N" by making such option designation as "-mslatency=N" (symbol "N" being positive integer). In a publication, i.e., IBM, "XL Fortran for AIX User's Guide Version 7 Release 1", Chapter 5 (will be referred to as "Publication 5" hereinafter), the following aspect is described. That is, the user can designate the cache size, the line size, and the associative number every level of the hierarchical cache by making the "-qcache" option.

With respect to the conventional latency hiding optimization and the conventional data localization, there are different optimizing methods, depending upon such a condition that data is located in which memory hierarchy when an object program is executed.

For example, in the instruction scheduling method, if the distance between a load instruction and a use instruction is increased, then the total number of registers to be used is also increased. Also, in the prefetch optimizing method, when the timing of the prefetch instruction becomes excessively early, there are some possibilities that the data is again ejected from the cache before the use instruction is carried out. As a result, when the memory latency becomes excessively large which is assumed in these optimizing methods, sufficiently effects achieved by these optimizing operations cannot be realized. In other words, when the optimizing operation using the main storage latency is applied to the data which hits the L2 cache (secondary cache), there are certain possibilities that the execution performance thereof is lowered, as compared with that for a case where the optimizing operation using the L2 cache latency is applied to the data. However, since it has not clearly been defined in the prior art which memory hierarchy the subject data of the load instruction is located in, the following problem occurred. That is, the main storage latency had to be assumed to be used when the optimizing operation was applied.

Also, in the data locality optimizing method, if the loop structure is converted into a complex loop structure, overheads of the loop execution will be increased. As a result, there are possibilities that the execution performance is lowered. In a case where the data to which the processor refers within the loop mainly causes the cache miss, the effect may be achieved by applying the data locality optimizing method since the total number of the cache misses is reduced. However, when the cache hits occur, since there is no effect achieved by reducing the total number of the cache misses, it is better not to apply the data locality optimizing method. Since it could not grasp as to whether or not the cache hit occurs in the prior art, the loop transformation has been applied even when the cache hits occur. As a consequence, there has been a problem that the execution performance may be lowered.

SUMMARY OF THE INVENTION

To solve the above-described problems, an object of the present invention is to provide a compiler capable of producing object codes optimized by considering a hierarchical memory structure on a computer system, and also to provide a code producing method of the compiler.

In accordance with the present invention, with respect to a compiler for producing an object program used to be executed on an architecture equipped with a plurality of memory hierarchies from a source program in conjunction with a computer system, both a step for interpreting either an option or a designation statement, and another step for executing an optimizing process directed to the designated memory hierarchy are provided. The option, or the designation statement designates that when a target object program is executed, the target program mainly refers to data present in which memory hierarchy among the plural memory hierarchies.

As the optimizing process directed to the memory hierarchy, a calculating/executing step, or a determining step is provided with the compiler. The former step calculates memory latency according to a designated memory hierarchy in response to a memory access instruction, and then, performs an optimizing process according to the calculated latency. The latter step determines a loop transformation method of loop interchange, loop unrolling, or loop tiling according to a designated memory hierarchy with respect to the memory access instruction.

FIG. 1 schematically indicates an outline of the present invention. In FIG. 1, assuming now that such data to which a source program "TEST1.f" refers during the execution thereof are mainly L2 cache data and data to which a source program "TEST2.f" refers during the execution thereof are mainly main storage data, optimizing methods with respect to the two source programs should be made different from each other.

However, in the conventional optimizing methods, the optimizing process assuming the main storage data has been applied to both the programs. A memory hierarchy mainly accessed by data to which a program refers has been determined based upon a data size and a loop size. The data size and loop size cannot be cleared by way of a static analysis by a compiler.

In accordance with the present invention, since there is provided means for designating which memory hierarchy data mainly belong to when an object program is executed, a compiler analyzes designation of a memory hierarchy (101), and then, performs an optimizing operation according to the designated memory hierarchy (103, 104, 105). As a result, an object program to which more advanced optimizing operation has been carried out can be produced. In a memory optimizing operation, code conversion is carried out with employment of such attributes as latency and a size of the designated memory hierarchy. In the example of FIG. 1, the optimizing operation (104) directed to the L2 cache data is applied to the source program TEST1.f, whereas the optimizing operation (105) directed to the main storage data is applied to the source program TEST2.f.

In accordance with the present invention, there is provided the means for designating which memory hierarchy data are mainly accessed to in the source program. As a result, application of an optimizing method having no effect when the data is present on the cache can be prevented; the instruction scheduling optimizing method and the prefetch optimizing method with employment of the memory latency according to the designated memory hierarchy can be applied; or the tiling process method with employment of such parameters as a cache size of a target cache according to the designated memory hierarchy can be applied. Whereby, the object program can be executed at a high speed.

Other objects, features and advantages of the invention will become apparent from the following description of the embodiments of the invention taken in conjunction with the accompanying drawings.

BRIEF DESCRIPTION OF THE DRAWINGS

FIG. 4 is diagram for representing an example of a source program containing a designation statement of a memory hierarchy which is mainly accessed when a program is executed.

FIG. 6 is a diagram for schematically indicating an example of a loop table.

DESCRIPTION OF THE EMBODIMENTS

Referring now to drawings, various embodiments of the present invention will be described.

Figure 1:
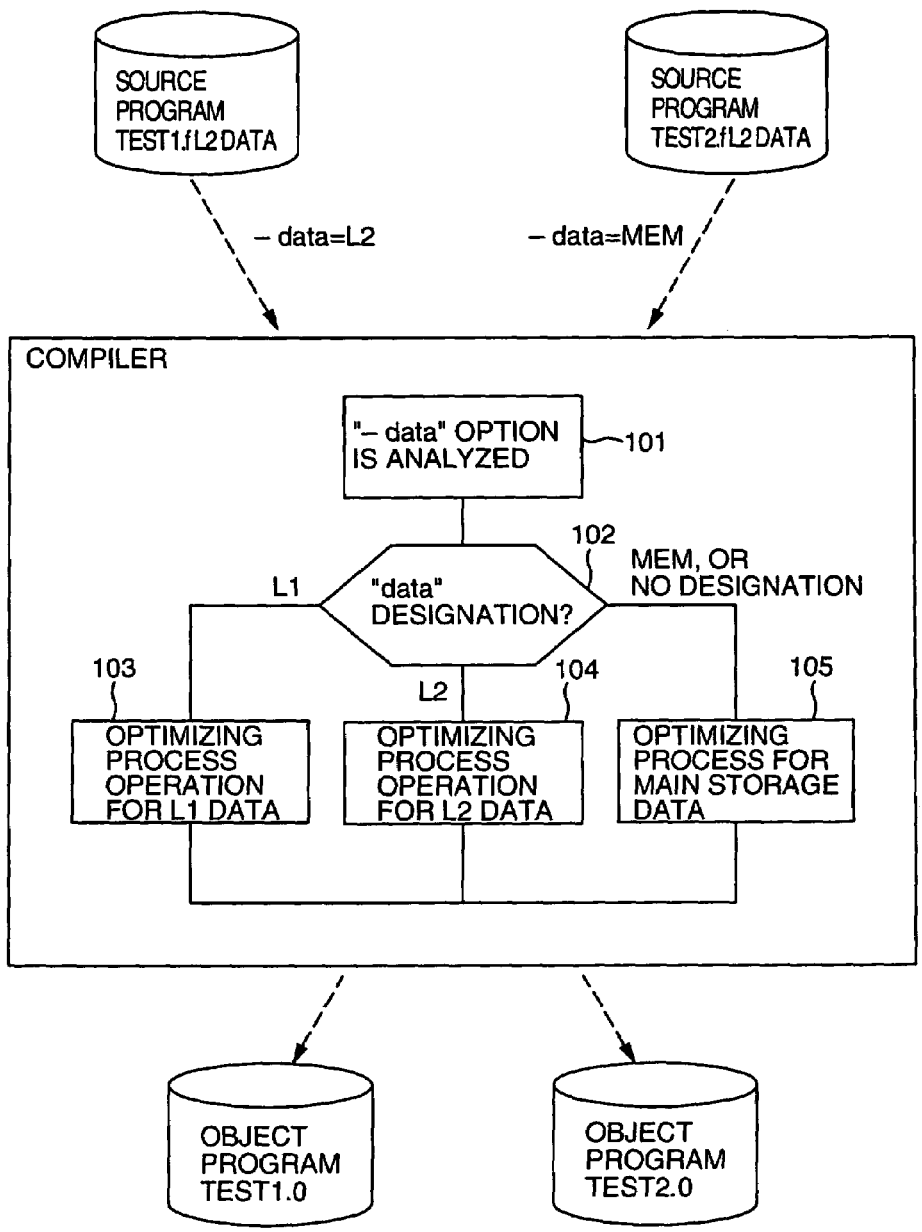
FIG. 1 is a diagram for schematically showing an outline of the present invention.
Figures 2, 3:
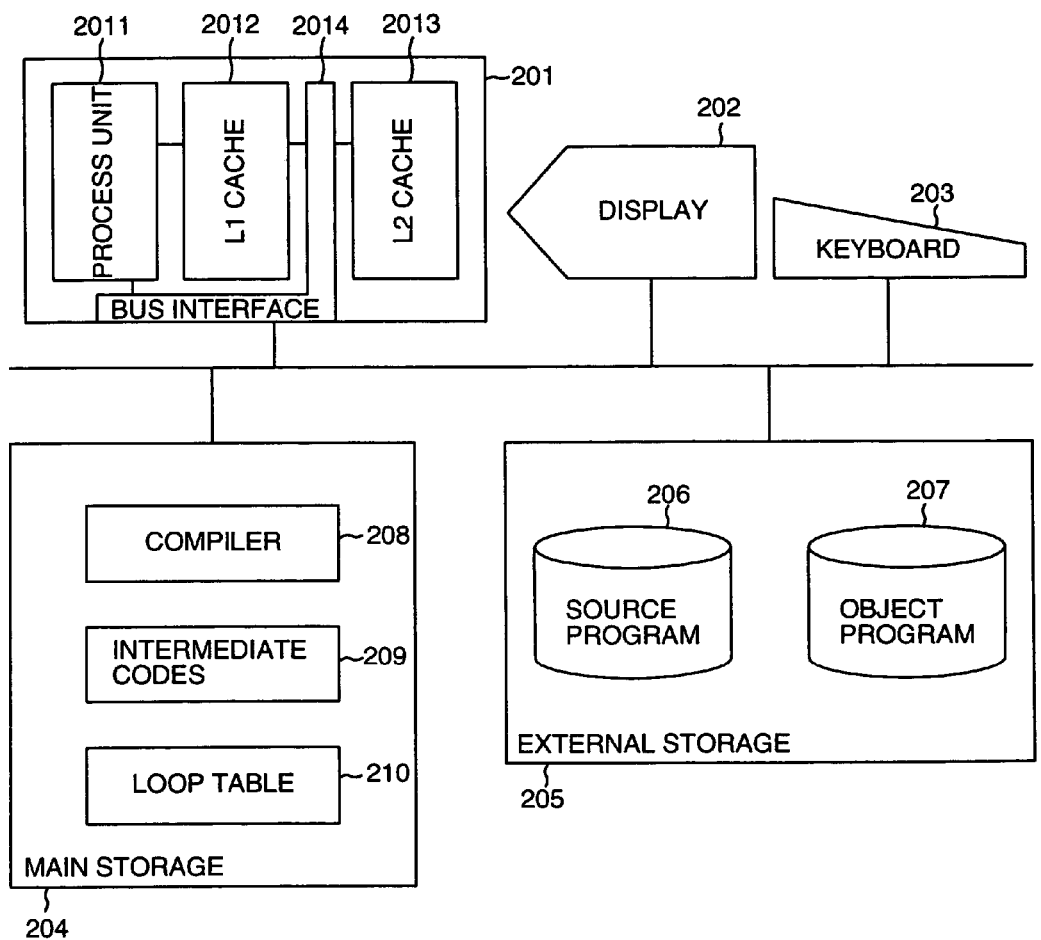
FIG. 2 is a schematic diagram for representing an arrangement of a computer system in which a compiler for executing an improved optimizing method is operated.
FIG. 3 is a diagram for indicating an example of designation by a compiler option of a memory hierarchy which is mainly accessed when a program is executed.

FIG. 2 is a schematic structural diagram of a computer system in which a compiler according to the present invention is operated.

This computer system is arranged by a CPU (central processing unit) 201, a display device 202, a keyboard 203, a main storage apparatus 204, and an external storage apparatus 205. The keyboard 203 accepts a compiler initiating command issued from a user. A compiler end message and an error message are displayed on the display device 202. Both a source program 206 and an object program 207 are stored in the external storage apparatus 205. A compiler 208, an intermediate code 209, and a loop table 210, which are required in a compiling processestage, are stored in the main storage apparatus 204. A compiling process is carried out by that the CPU 201 executes the compiler program 208. It should be noted that the CPU 201 internally has a level-1 (L1) cache (primary cache) 2012 and a level-2 (L2) cache (secondary cache) 2013, and constitutes a memory hierarchy in order that process may be executed at a high speed by a process unit 2011 which contains a fetch/decode unit, an execution unit, and the like. The level-1 cache 2012 owns an access latency different from an access latency of the level-2 cache 2013, which are accessed by this process unit 2011. It is so assumed that in the below-mentioned explanation, such a process implies process/process sequence of a compiler. In this process, the CPU 201 interprets a codes described in a program used in the compiler. It should also be noted that since the computer system shown in FIG. 2 is equipped with the level-1 cache 2012, the level-2 cache 2013, and the main storage apparatus 204, this computer system may be used as such a computer system which executes an object program produced by the compiler according to the present invention.

FIG. 3 indicates an example of a compiler initiating command inputted from a user, which is accepted by the computer system in order to issue a memory hierarchy instruction when a source program is compiled. Symbol "f90" indicates an example of an initiating command of a Fortran compiler, symbol "test.f" shows an example of a designation of a source program, and symbol "-0" indicates an example of a compiler option. In this embodiment, a memory hierarchy designation option is expressed by "-data", and designates that data contained in a program is mainly located in which memory hierarchy. As the memory hierarchies, "L1" indicative of an L1 cache; "L2" representative of an L2 cache; and "MEM" indicative of a main storage can be designated. Symbol "-data=L2" (301) of FIG. 3 designates that data are mainly present in the L2 cache.

In the example of FIG. 3, the memory hierarchy designation is made in the compiler initiating command. The memory hierarchy designation may also be alternatively described as a designation statement contained in a source program. FIG. 4 indicates an example of a source program to which a memory hierarchy designation is added. A designation statement 401 designates that data within a loop of "DO 10" mainly hits the L1 cache. Another designation statement 402 designates that data within a loop of "DO 20" mainly accesses the main storage. Another designation statement 403 designates that a loop of "DO 30" mainly hits the L2 cache (namely miss L1 cache).

Figure 5:
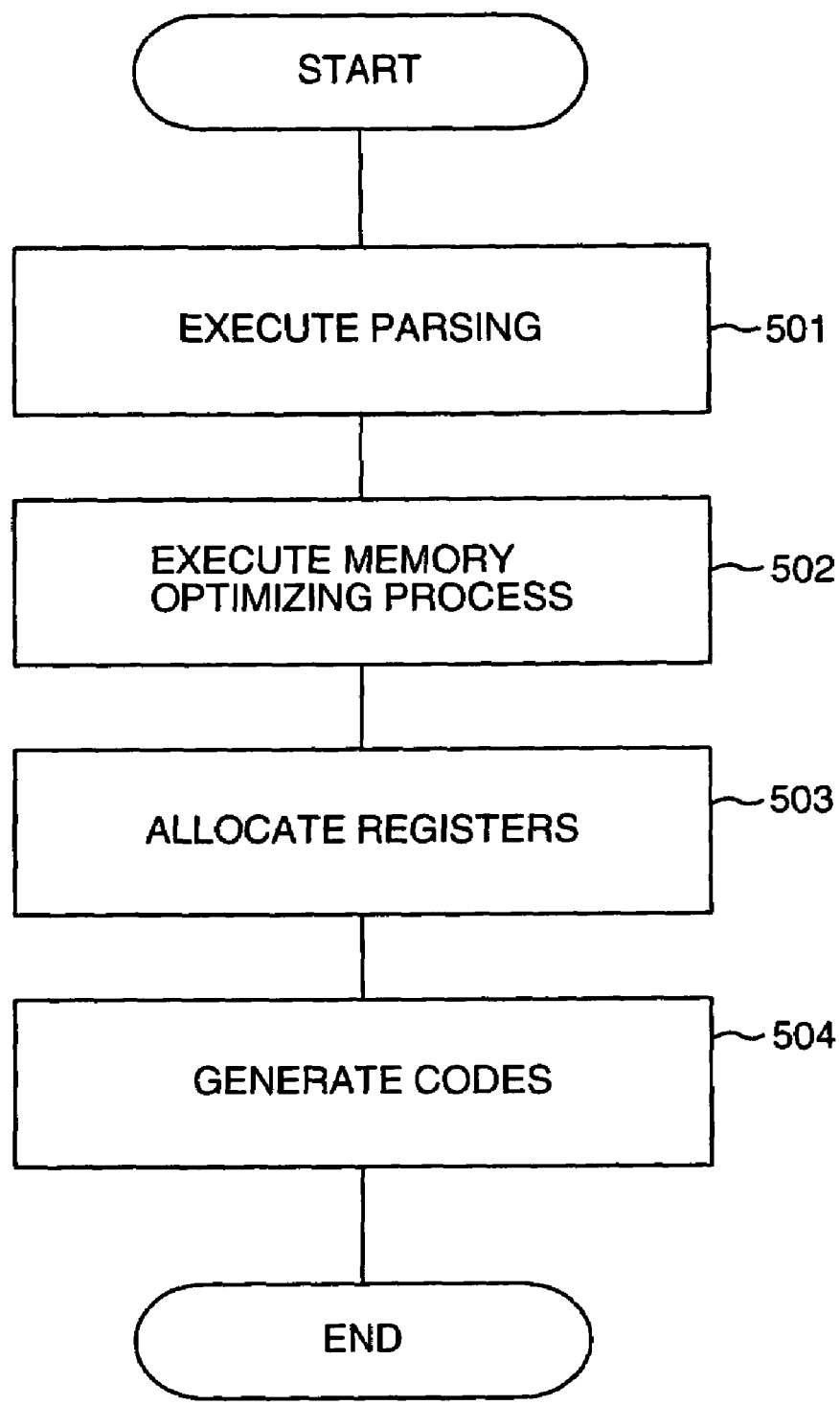
FIG. 5 is a flowchart for explaining a processing sequence of a compiler.

FIG. 5 represent a processesequence of the compiler 208 which is operated in the computer system of FIG. 2. The process of the compiler is carried out in this order of a parsing process 501, a memory optimizing process 502, a register allocating process 503, and a code generating process 504.

In the parsing process 501, while the source program 206 is inputted, both a parsing operation and a loop analyzing operation are carried out so as to output both intermediate codes 209 and a loop table 210. In this parsing step 501, both a memory hierarchy designation statement and a memory hierarchy designation option are analyzed which constitute the feature of the present invention, and then, the analyzed results are registered in the loop table 210. This loop table 210 will be explained later. Since the memory optimizing process 502 corresponds to a step which constitutes the feature of the present invention, this memory optimizing process 502 will also be described later more in detail. In the register allocating process 503, registers are allocated to the respective nodes of the intermediates codes 209. In the code generating process 504, the intermediate codes 209 are converted into the object program 207 and this object program 207 is outputted.

FIG. 6 indicates an example of a content of the loop table 210. In this loop table 210, only a data designation field 602 which constitutes the feature of the present invention is indicated in addition to a loop number 601 used to identify loops of the source program 206. The loop table 210 is produced in the parsing process 501. This table producing process is indicated in a flowchart of FIG. 13, which corresponds to a data designation field setting process.

Figure 13:
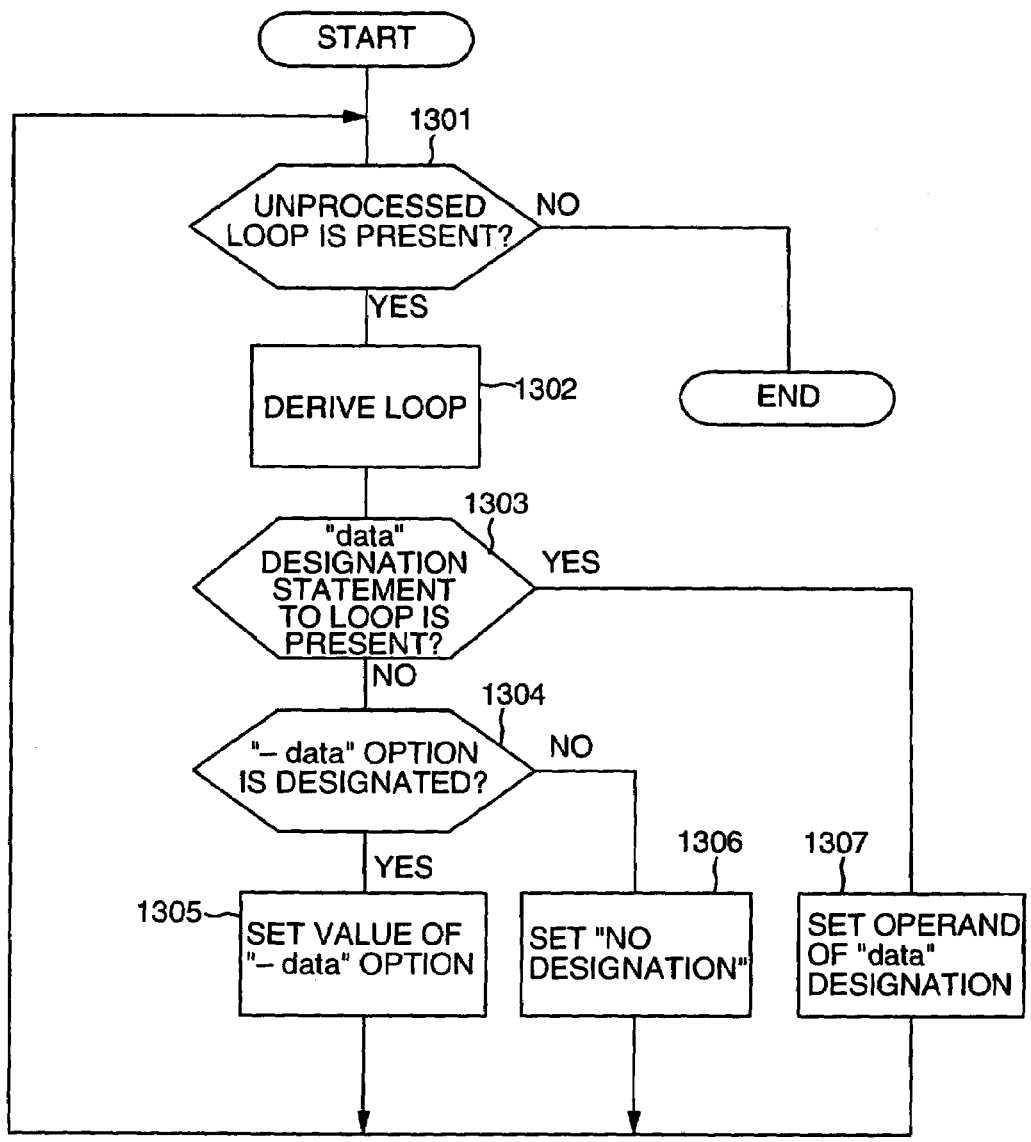
FIG. 13 is a flowchart for describing a sequential process for setting a data designation field.

In the sequential process of FIG. 13, loops of the source program 206 are traced in a sequential manner to be processed. In a step 1301, judgement is made as to whether or not a loop which has not yet been processed is present. When there is a loop which has not yet been processed, an unprocessed loop is derived in a step 1303. In a step 1303, a check is made as to whether or not a "data" designation statement is present in the source program 206 to be compiled. This "data" designation statement corresponds to such a memory hierarchy designation to the loop as shown in FIG. 4. When the "data" designation statement is present in the source program 206, an operand of this "data" designation statement is set in the loop table 210 in a step 1307. In the example of FIG. 4, with respect to the loop of "DO 10", "L1" is set to a column of the "data" designation statement. When the "data" designation statement is not present in the source program 206, the sequential process is advanced to a step 1304. In this step 1304, a check is made as to whether or not a "-data" option corresponding to the memory hierarchy designation option is designated in the compiler initiating command. In a case where the "-data" option is designated in the compiler initiating command, the process is advanced to a step 1305 in which a value of the "-data" option is set. When the "-data" option is not designated in the compiler initiating command, the process is advanced to a step 1306. In this step 1306, "no designation" is set.

Figure 7:
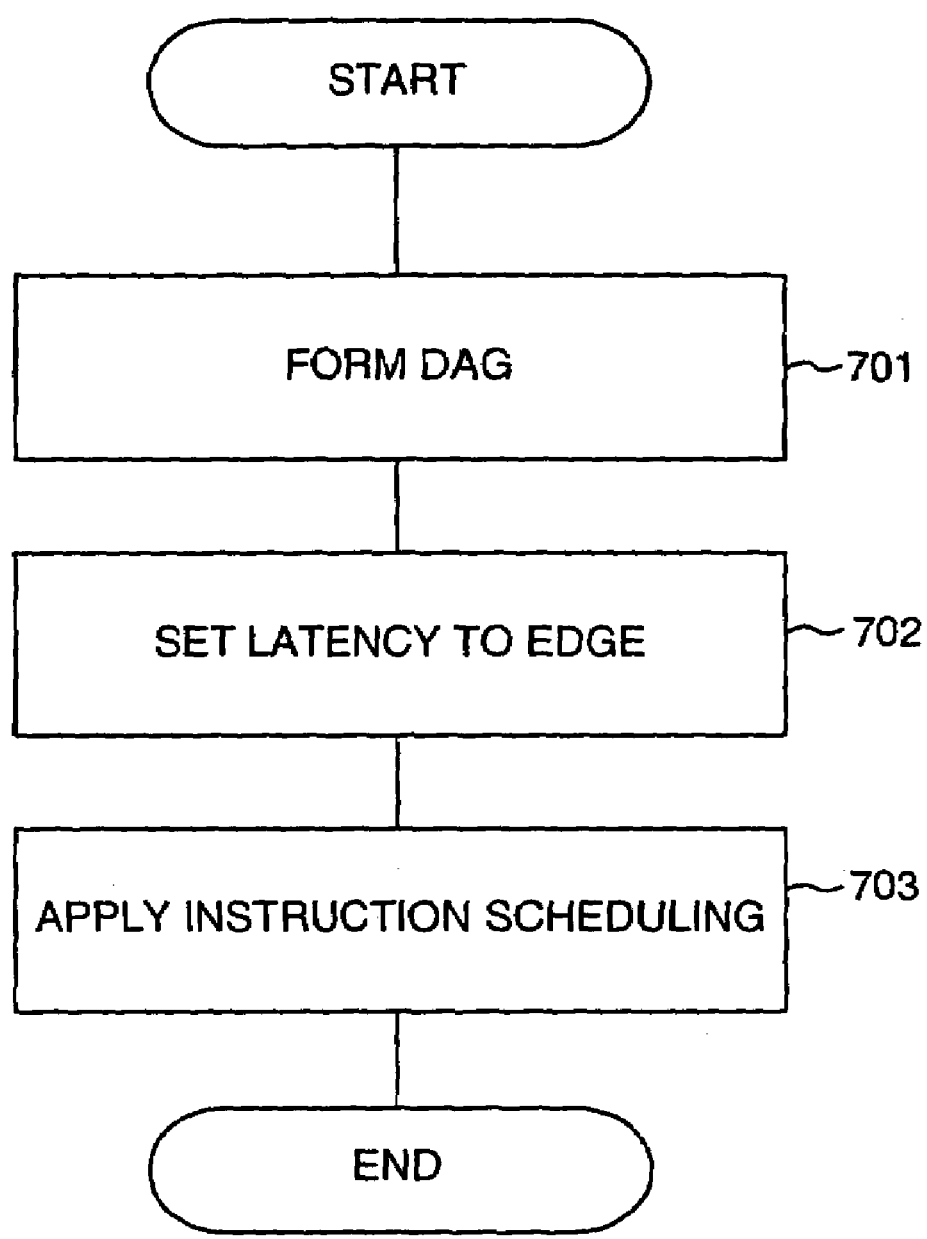
FIG. 7 is a flowchart for explaining a processing sequence of an instruction scheduling method.

Several examples as to the memory optimizing process 502 are described as follows:

As a first example of the memory optimizing process, an instruction scheduling method is carried out in the memory optimizing process 502. FIG. 7 shows a sequential process of this instruction scheduling method.

Figure 8:
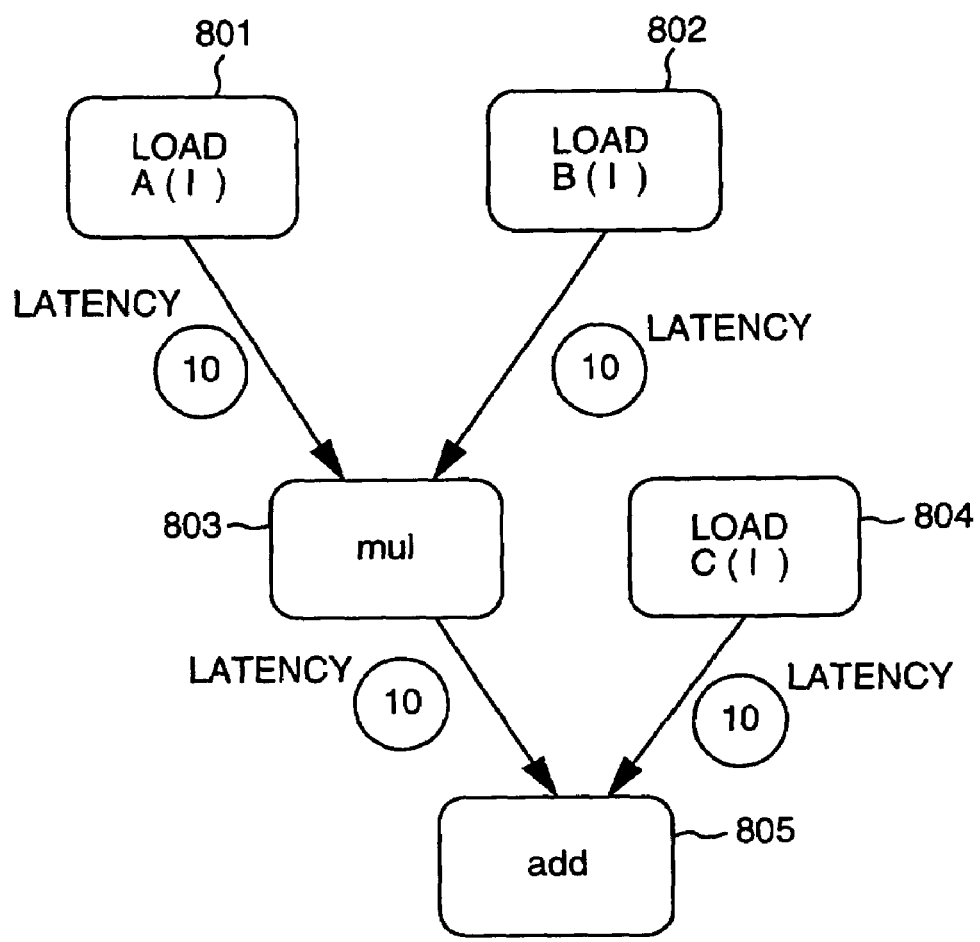
FIG. 8 is a diagram for illustratively showing an example of a DAG.

In a step 701 of the flowchart as to the instruction scheduling method of FIG. 7, a DAG (directed acyclic graph) is formed. FIG. 8 indicates an example of such a DAG corresponding to A(I)*B(I)+C(I). The respective nodes of this DAG correspond to instructions available on intermediate codes. Edges among the nodes indicate restrictions of execution orders. For instance, in a "mul" calculation of a node 803, both a result of "load" of a node 801 and a result of "load" of a node 802 are used as operands, so that both the node 801 and the node 802 must be executed prior to the node 803. This relationship is represented by an edge from the node 801 to the node 803, and by another edge from the node 802 to the node 803.

Figure 9:
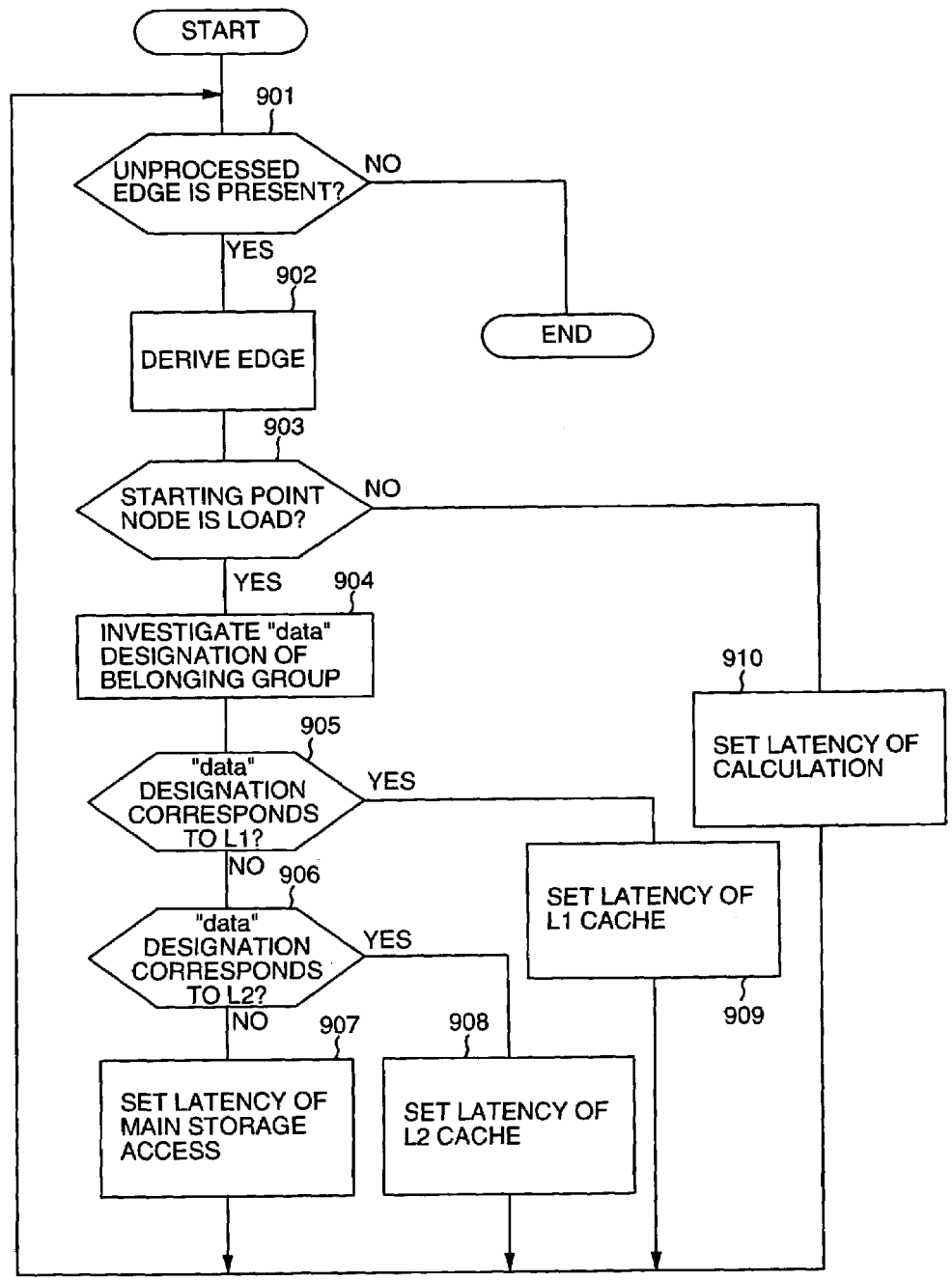
FIG. 9 is a flowchart for describing a sequential process of setting a latency of a DAG edge.

In a step 702, latencies are set to the edges of the DAG formed in the step 701. A detailed processesequence of this step 702 is indicated in FIG. 9.

In this sequential process, while the edges on the DAG are traced, these edges are sequentially processed. In a step 901 of the flowchart shown in FIG. 9, a judgement is made as to whether or not an edge which has not yet been processed is present. When there is no unprocessed edge, this process is ended. To the contrary, when there is such an unprocessed edge, the process is advanced to a step 902. In this step 902, the unprocessed edge is derived to be set to an edge which should be processed. In a step 903, a check is made as to whether or not a starting point node of the edge corresponds to a load instruction. When the starting point node is not equal to the load instruction, the process is advanced to a step 910. In this step 910, a value of a latency corresponding to the operation of the starting point node is set to the edge. Then, the process of this edge is accomplished, and the process is returned to the previous step 901.

In a step 904, a loop to which a node belongs is investigated, and a "data" designation is investigated based upon the loop table 210. In a step 905, a check is made as to whether or not the "data" designation corresponds to "L1". When the "data" designation corresponds to "L1", the process is advanced to a step 909. In this step 909, a value of a latency of the L1 cache is set to an edge. Then, the process is returned to the previous step 901. When the "data" designation is not equal to "L1", the process is advanced to a step 906. In this step 906, a check is made as to whether or not the "data" designation corresponds to "L2". When the "data" designation corresponds to "L2", the process is advanced to a step 908. In this step 908, a value of a latency of the L2 cache is set to an edge, and then, the process is returned to the previous step 901. When the "data" designation is not equal to "L2", namely, in the case that the "data" designation corresponds to the "MEM", or no designation, the process is advanced to a step 907. In this step 907, a value of a latency of the main storage access operation is set to the edge, and then, the process is returned to the previous step 901.

FIG. 8 represents an example of such a case where a "data" designation corresponding to a node of each load is "L2", and a latency of the L2 cache is 10 cycles.

This embodiment can achieve the following effect. That is, since a latency of a DAG edge is set in response to such a fact that subject data of a load instruction is present in any one of the L1 cache, the L2 cache, and the main storage, the instruction scheduling method can be applied in which the more correct latency is assumed with respect to the load instruction.

Figure 10:
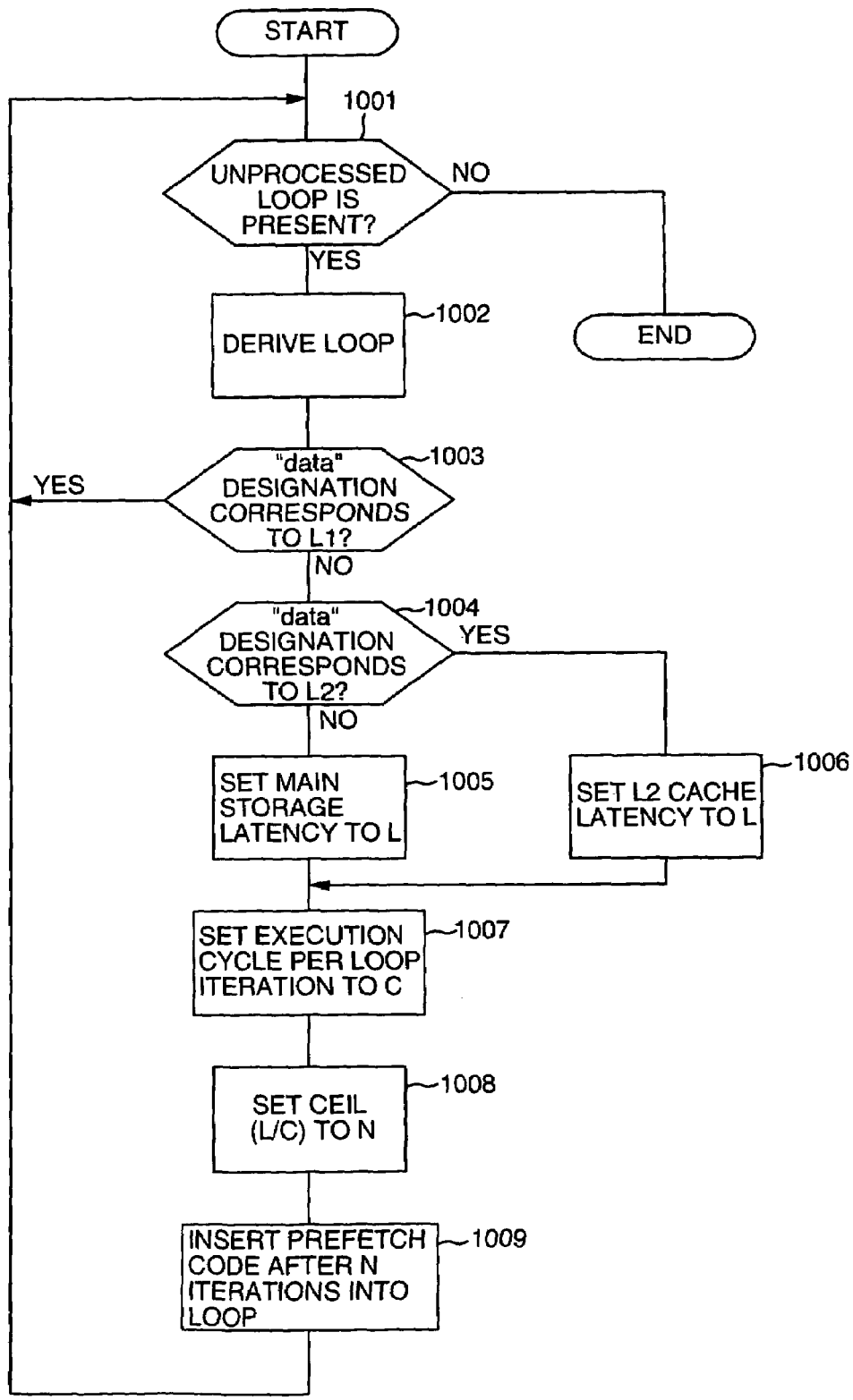
FIG. 10 is a flowchart for describing a sequential process of a prefetch method.

Next, description is made of such an example that a prefetch optimizing operation is carried out in the memory optimizing process 502 according to the present invention. FIG. 10 is a flowchart for explaining a process sequence of the prefetch optimizing method.

In a step 1001 of the prefetch optimizing processeshown in FIG. 10, judgement is made as to whether or not there is a loop which has not yet been processed. When there is an unprocessed loop, the unprocessed loop is derived in a step 1002. In a step 1003, a "data" designation of the derived loop is investigated based upon the loop table 210. When the "data" designation corresponds to "L1", the process is returned to the previous step 1001. This is because it is so judged that there is no effect in the prefetch optimizing method, since the data of this loop is already present in the L1 cache. In a step 1004, a check is made as to whether or not the "data" designation corresponds to "L2". When the "data" designation is equal to "L2", the process is advanced to a step 1006. In this step 1006, the latency of the L2 cache is set to "L". When the "data" designation is not equal to "L2", namely in a case where the "data" designation corresponds to either "MEM" or no designation, the process is advanced to a step 1005. In this step 1005, the latency of the main storage is set to "L".

In a step 1007, the total number of execution cycles per loop iteration is calculated, and then, the calculated execution cycle number is set to "C". In a step 1008, such a value obtained by rounding up (L/C) to an integer is set to "N". In a step 1009, a prefetch code after N iterations is produced, and this produced prefetch code is inserted into the loop.

This embodiment has such an effect that since the latency of the main storage is set in response to such a fact as to whether or not the data is present in the L2 cache, the prefetch code is produced based upon the more proper prefetch distance. Also, this embodiment owns such an effect that when the data is present in the L1 cache, the unnecessary prefetch code is not produced.

Figure 11:
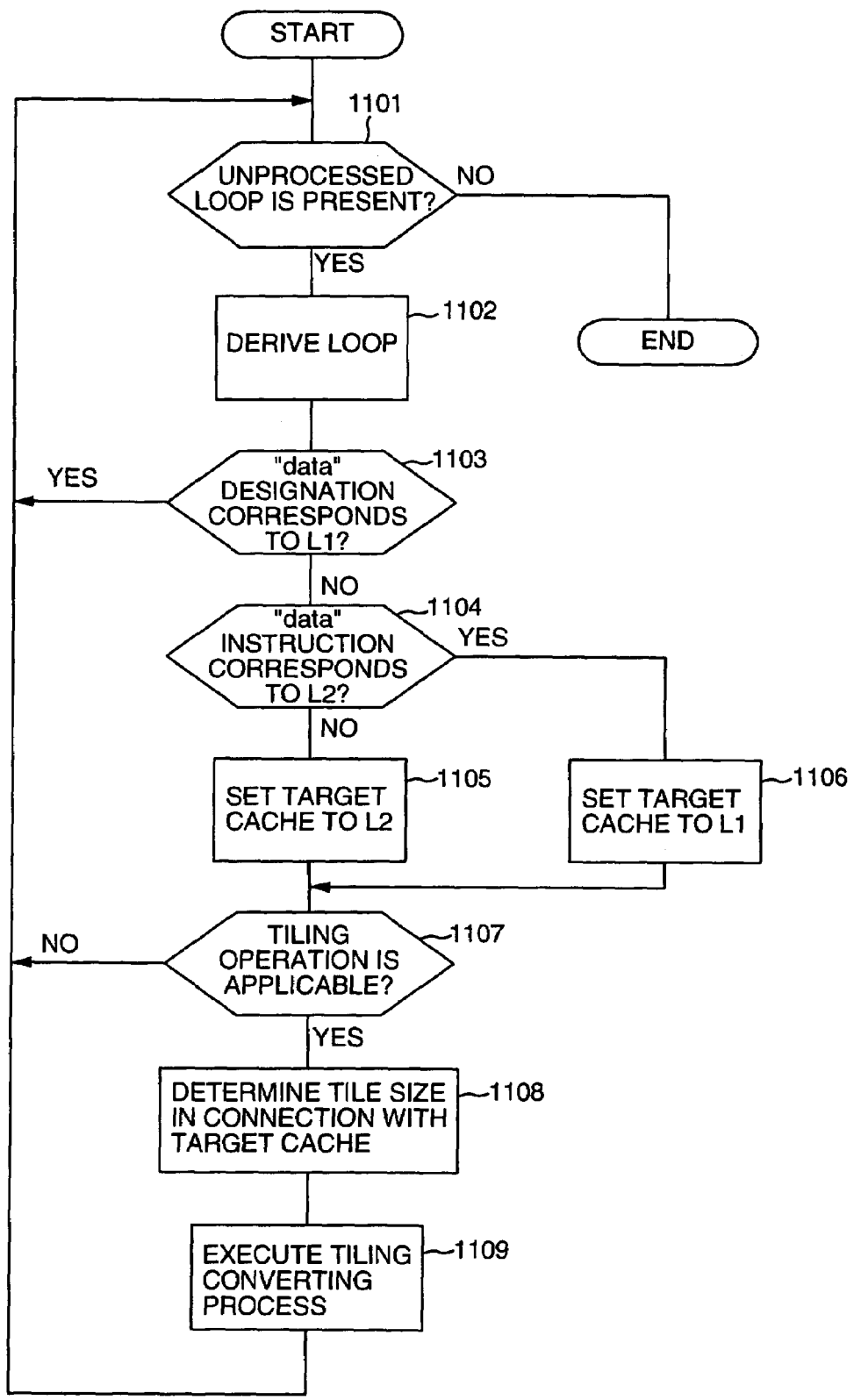
FIG. 11 is a flowchart for describing a sequential process of a tiling method.

Next, description is made of such an example that the tiling method is carried out in the memory optimizing process 502 according to the present invention. FIG. 11 shows a flowchart for explaining a sequential process as to the tiling method.

In a step 1101 of the tiling method shown in FIG. 11, judgement is made as to whether or not there is a loop which has not yet been processed. When there is an unprocessed loop, the unprocessed loop is derived in a step 1103. In a step 1103, a "data" designation of the derived loop is investigated based upon the loop table 210. When the "data" designation corresponds to "L1", the process is returned to the previous step 1101. This is because it is so judged that there is no effect in the tiling method, since the data of this loop is already present in the L1 cache. In a step 1104, a check is made as to whether or not the "data" designation corresponds to "L2". When the "data" designation is equal to "L2", the process is advanced to a step 1106. In this step 1106, a target cache is set as "L1". When the "data" designation is not equal to "L2", namely in a case where the "data" designation corresponds to either "MEM" or no designation, the process is advanced to a step 1105. In this step 1105, a target cache is set as "L2".

In a step 1107, an application condition of the tiling method is investigated, and it is determined as to whether or not an unprocessed loop corresponds to a target loop to which the tiling method is applied. As the application condition, a check is made as to whether or not the unprocessed loop corresponds to a multiply nested loop, whether or not the unprocessed loop can satisfy a dependence test, or whether or not the unprocessed loop can achieve the tiling effect. A detailed judging method of the application condition is described in Publication 2. When the unprocessed loop is not equal to the target loop to which the tiling method is applied, the process of this loop is accomplished. Then, the process is returned to the previous step 1101. To the contrary, when the unprocessed loop corresponds to the target loop to which the tiling method is applied, the process is advanced to a step 1108.

In the step 1108, a tile size is determined based upon the cache size, an associative degree, and the like of the target cache determined in both the steps 1105 and 1106. A method of determining a tile size is described in Publication 2.

In a step 1109, a tiling conversion process is carried out in accordance with the tile size determined in the step 1108. The tiling conversion process is also described in Publication 2.

In accordance with this embodiment, since the target cache is determined according to the "data" designation, there is such an effect that the tiling conversion based upon the more proper tile size is applied. Also, there is another effect that in a case where the data is present in the L1 cache, unnecessary tiling conversion is not applied.

Figure 12:
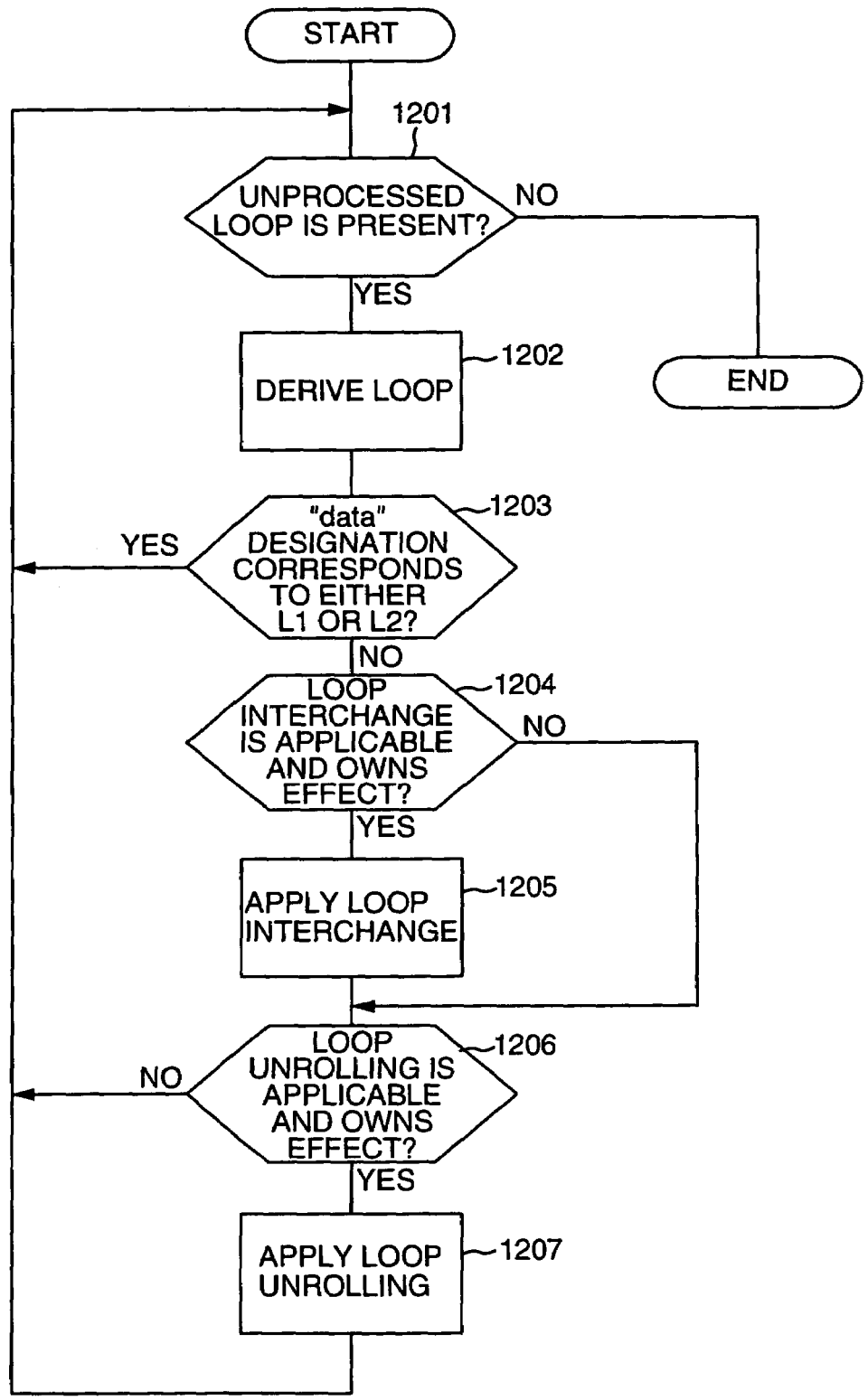
FIG. 12 is a flowchart for explaining a sequential process as to a loop interchange and a loop unrolling.

Next, description is made of such an example that both a loop interchange and a loop unrolling are carried out in the memory optimizing process 502 according to the present invention. FIG. 12 shows a flowchart for explaining sequential processes as to both the loop interchange and the loop unrolling.

In accordance with this embodiment, in a case where data is present in either the L1 cache or the L2 cache, it is so considered that there is no effect achieved by the loop interchange and the loop unrolling. Thus, the application of the loop interchange and the loop unrolling is ceased. Only when it is predictable that data is present in the main storage, the memory optimizing process 502 is applied.

In a step 1201 of the loop interchange and the loop unrolling shown in FIG. 12, judgement is made as to whether or not there is a loop which has not yet been processed. When there is an unprocessed loop, the unprocessed loop is derived in a step 1202. In a step 1203, a "data" designation of the derived loop is investigated based upon the loop table 210. When the "data" designation corresponds to "L1", or "L2", the process is returned to the previous step 1201. This is because it is so judged that there is no effect in the optimizing process since the data of this loop is already present in the cache. In a step 1204, an application condition of the loop interchange is investigated. When the unprocessed loop corresponds to the application target loop, the loop interchange is applied to this unprocessed loop in a step 1205. In a step 1206, the application condition of the loop unrolling is investigated. When the unprocessed loop corresponds to the application target loop, the loop unrolling is applied to this unprocessed loop in a step 1207.

This embodiment owns the following effect. That is, in such a case that the data contained in the loop is mainly present in the cache, both the loop interchange and the loop unrolling are not applied when they are unnecessary.

Alternatively, all or several optimizing processes of the memory optimizing processes 502 may be combined with each other. Furthermore, any one optimizing process contained in the memory optimizing processes 502 may be carried out.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A compiler for producing an object program from a source program to be executed on an architecture equipped with a plurality of memory hierarchies, the compiler configured to operate a computer to perform steps comprising:
    a step for detecting a designation statement designating which memory hierarchy among the plurality of memory hierarchies will serves as the main data store for an object program when the object program is executed;
    a step for performing an optimizing process directed to said designated memory hierarchy to produce the object program; and
    a step for storing the object program on a data store.

2. A compiler as claimed in claim 1, wherein:
    a memory latency is calculated according to the designated memory hierarchy with respect to an instruction for accessing a memory location in the designated memory hierarchy; wherein said optimizing process is based on the calculated latency.

3. A compiler as claimed in claim 1, wherein:
    a loop transformation method of a loop interchange, a loop unrolling, or a loop tiling is determined according to the designated memory hierarchy with respect to a memory access instruction; and wherein said optimizing process is based thereon.

4. An object program producing method executed by both a computer system and a compiler executing on the computer system for producing an object program to be executed on an architecture equipped with a plurality of memory hierarchies from a source, program,
    said method comprising:
    a step for detecting a designation statement designating which memory hierarchy an object program mainly refers to for storing and accessing data when the object program is executed;
    a step for performing an optimizing process directed to said designated memory hierarchy to produce the object program; and
    a step for outputting and storing the object program on a data store.

5. A code producing method as claimed in claim 4, wherein:
    for said optimizing process directed to the designated memory hierarchy, a memory latency is calculated according to the designated memory hierarchy with respect to a memory access instruction; and an optimizing process according to the calculated latency is carried out.

6. A code producing method as claimed in claim 4, wherein:

for said optimizing process directed to the designated memory hierarchy, a loop transformation method of a loop interchange, a loop unrolling, or a loop tiling is determined according to the designated memory hierarchy with respect to a memory access instruction.

7. A storage medium wherein:

said storage medium has stored there into a compiler for producing an object program from a source program to be executed on an architecture equipped with a plurality of memory hierarchies, the compiler configured to operate a computer to perform steps comprising:

a step for detecting a designation statement designating which memory hierarchy among the plurality of memory hierarchies will serves as the main data store for an object program when the object program is executed;

a step for performing an optimizing process directed to said designated memory hierarchy to produce the object program; and a step for storing the object program on a data store.

8. A method for producing an object program to be executed on an architecture equipped with a plurality of memory hierarchies from a source program in conjunction with a computer system, wherein:

said computer system executes:

a step for detecting designation statement designating which hierarchy an object program mainly refers to for storing data when said object program is executed;

a step for producing said object program in which an optimizing process including different processes sequences according to said plural memory hierarchies is carried out with respect to said source program by selecting a process sequence corresponding to the memory hierarchy designated by said designation statement; and a step for storing the object program on a data storage device.

9. An object program producing method as claimed in claim 8, wherein:

said designation statement is described in an option within a compiler initiating command.

10. An object program producing method as claimed in claim 8, wherein:

said designation statement is inserted into said source program.

11. An object program producing method as claimed in claim 10, wherein:

said designation statement is applied to each of plural loops contained in said source program;

said analysis step includes a step for forming a loop table indicative of a correspondence relationship between the respective loops and the memory hierarchies designated by the designation statements corresponding to said loops; and said execution step includes a step for acquiring a memory hierarchy designated by said designation statement by referring to said loop table.

12. An object program producing method as claimed in claim 8, wherein:

said memory hierarchies include a hierarchy constructed of a primary cache, a hierarchy constructed of a secondary cache, and a hierarchy constructed of a main storage apparatus.

13. An object program producing method as claimed in claim 8, wherein:

said optimizing process contains at least one of an optimizing process by instruction scheduling, a prefetch optimizing process, and an optimizing process by loop tiling and loop interchange/loop unrolling.

14. An object program producing method as claimed in claim 13, wherein:

said optimizing process corresponds to the optimizing process by the instruction scheduling; and a number of memory access latency cycles to be set are different from each other according to said memory hierarchies in said processes sequence.

15. An object program producing method as claimed in claim 13, wherein:

said optimizing process corresponds to the prefetch optimizing process; and timing of a prefetch code to be inserted is different from each other according to said memory hierarchies in said processes sequence.

16. An object program producing method as claimed in claim 13, wherein:

said optimizing process corresponds to the optimizing process by the loop tiling; a tile size is different from each other according to said memory hierarchies in said processes sequence.

17. An object program producing method as claimed in claim 13, wherein:

said optimizing process corresponds to the optimizing process by the loop interchange/loop unrolling; and in said processes sequence, it is determined to apply, or not to apply either the loop interchange or the loop unrolling according to said memory hierarchies.

18. An apparatus for producing an object program used to be executed on an architecture equipped with a plurality of memory hierarchies from a source program, comprising:

a storage apparatus for previously storing thereinto an optimizing process containing different process sequences according to said plurality of memory hierarchies;

an input apparatus for inputting said source program and a designation statement designating which memory hierarchy an object program mainly refers to data present in, when said object program is executed;

a processing apparatus for producing an optimized object program based upon both said source program and said designation statement; and an output apparatus for outputting said optimized object program; wherein:

said processing apparatus executes:

a step for analyzing said designation statement;

a step for producing an object program which has been optimized as to an access to said memory hierarchy by selecting a processes sequence corresponding to the memory hierarchy designated by said designation statement; and a step for outputting said optimized object program from said output apparatus.

* * * * *